United States Patent [19]

Ruocco

[11] Patent Number: 5,205,935
[45] Date of Patent: Apr. 27, 1993

[54] HIGH PERFORMANCE FIXED FILM BIOREACTOR

[75] Inventor: Joseph J. Ruocco, Longboat Key, Fla.

[73] Assignee: AAA Environmental Services Corp., Longboat Key, Fla.

[21] Appl. No.: 833,065

[22] Filed: Feb. 10, 1992

[51] Int. Cl.$^5$ .............................. C02F 3/06; C02F 3/28
[52] U.S. Cl. ..................................... 210/603; 210/610; 210/615; 210/629; 210/150; 210/194; 210/218
[58] Field of Search ............... 210/150, 151, 194, 196, 210/197, 615, 617, 618, 220, 620, 629, 103, 610, 218

[56] References Cited

U.S. PATENT DOCUMENTS

| | | | |
|---|---|---|---|
| 3,371,033 | 2/1968 | Simmons et al. | 210/150 |
| 3,956,128 | 5/1976 | Turner | 210/150 |
| 4,411,780 | 10/1983 | Suzuki et al. | 210/150 |
| 4,469,599 | 9/1984 | Gros et al. | 210/150 |
| 4,561,974 | 12/1985 | Bernard et al. | 210/151 |
| 4,582,600 | 4/1986 | Atkinson et al. | 210/151 |
| 4,627,917 | 12/1986 | Morper | 210/150 |
| 4,915,841 | 4/1990 | Lagana et al. | 210/617 |
| 4,940,546 | 7/1990 | Vogelpohl et al. | 210/617 |
| 5,030,353 | 7/1991 | Stuth | 210/151 |
| 5,096,579 | 3/1992 | Jordan et al. | 210/615 |

*Primary Examiner*—Stanley S. Silverman
*Assistant Examiner*—Christopher Upton

[57] ABSTRACT

A method and apparatus for the continuous degradation of hazardous paint and organic solvent wastes. The apparatus includes a high performance fixed film bioreactor system into which is fed waters contaminated with paints or solvents from industrial operations and which utilizes the characteristic of either anaerobic or aerobic microorganisms growing on a fixed film for the degradation of these solvents and purification of contaminated waters. The bioreactor incorporates novel internal flow features which result in highly effective destruction of organic wastes in aqueous streams.

12 Claims, 4 Drawing Sheets

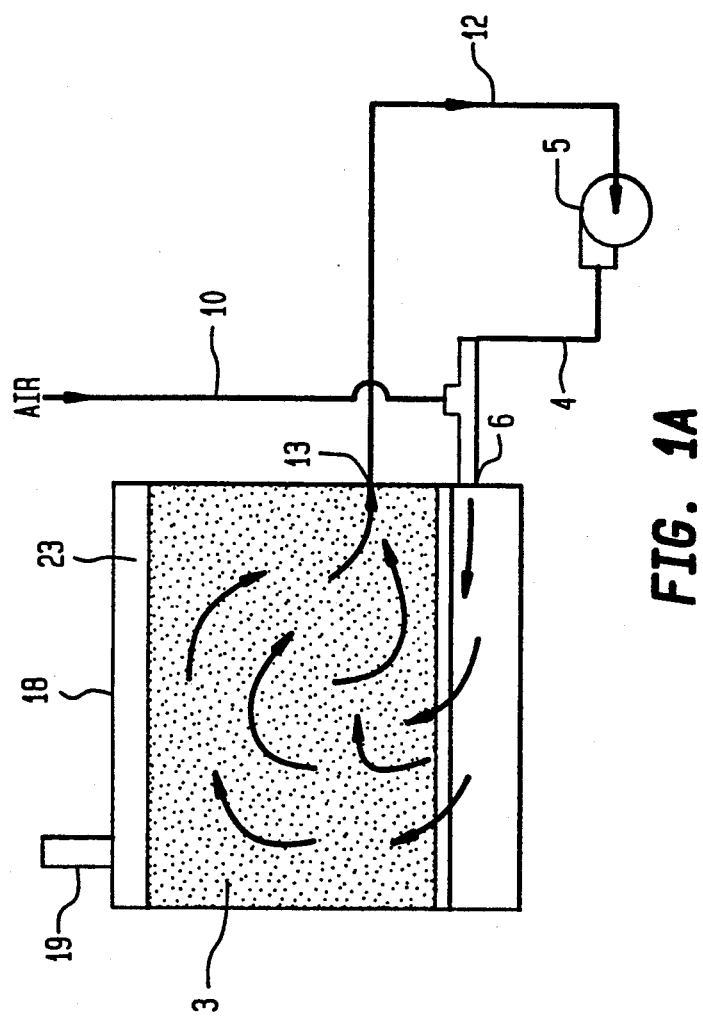

HIGH PERFORMANCE FIXED FILM BIOREACTOR

BACKGROUND OF THE INVENTION

The present invention relates to an apparatus and method for treating waters contaminated with paint or organic solvent wastes, as well as other organic wastes. More particularly, the invention relates to an apparatus for microbiological destruction of paint and solvent in contaminated waters wherein these contaminants are considered to be hazardous.

Worldwide, the use of solvent organic substances and petroleum distillation substances for the formulation of latex-based paints, degreasing, de-inking, and other industrial applications has resulted in the widespread use of these organic substances and very often in the contamination of waters used for cleaning equipment and surfaces, and groundwaters as the result of spills and leaking storage tanks and piping.

Disposal of wastewaters contaminated with paint or solvents presents a costly problem to many industrial facilities as they are classified as hazardous substances due to toxicity, flammability, corrosivity, or irritability. On site disposal of hazardous compounds is often desirable, however, presently accepted means of destruction is often cost prohibitive for the generator.

Biological degradation of these hazardous substances presents a cost-effective alternative to incineration of chemical/physical oxidation techniques.

Accordingly is an object of the invention to present an apparatus capable of biological destruction of the hazardous substances.

It is a further object of the invention to present an apparatus capable of simple, low cost operation for application on site for the biodegradation of these substances.

It is yet another object of the invention to present an apparatus that is capable of high rates of destruction of the substance.

It is yet a further object of the invention to present an apparatus that is modular and portable so that it may be simply relocated from site to site.

It is yet another object of the invention to present an apparatus capable of utilizing either anaerobic or aerobic micro-organism cultures for the rapid destruction of these substances.

In accordance with these and other objects which will become apparent hereinafter, the instant invention will now be described with reference to the accompanying drawings.

SUMMARY OF THE INVENTION

Disclosed is an apparatus for the biological degradation of aqueous wastes including solvents, paint components, and other organic pollutants.

The bioreactor utilizes fixed film technology, wherein micro-organisms, either aerobic or anaerobic, will attach to the film or packing material and effect biodegradation of organic pollutants in wastewaters or groundwaters so contaminated.

The invention features rapidly moving liquid across the surface of a fixed film in order to increase biodegradation rates and to eliminate plugging of the bioreactor packing. Rapid internal flow inside the reactor space is beneath the bioreactor packing.

In aerobic applications the jets are eductors which by venturi action, educt ambient air into the pumped liquid stream thus accomplishing high efficiency aeration or oxygen transfer to the bioreactor liquid. Oxygen so transferred to liquid is used as the terminal electron acceptor by aerobic micro-organisms which are attached to the surface of the bioreactor packing, while these micro-organisms utilize organic pollutants, solvents, or paint components as electron donors, resulting in the degradation of these organic pollutants to carbon dioxide and water.

In anaerobic applications, the jets do not educt ambient air in the reactor liquid but are used only for the rapid flow of liquid across the surface of the anaerobic microbial fixed film. In this case anaerobic micro-organisms serve as inocula for the bioreactor and will colonize or attach to the surface of packing material wherein these micro-organisms biodegrade organic pollutants such as certain solvents and paint components to carbon dioxide and methane gas. The rapid movement of bioreactor liquid across the surface of the microbial fixed film increases the rate of biodegradation of organic pollutants.

DESCRIPTION OF THE DRAWINGS

FIG. 1A is an end view of the bioreactor configured for aerobic operation.

DETAILED DESCRIPTION

Figure 1:
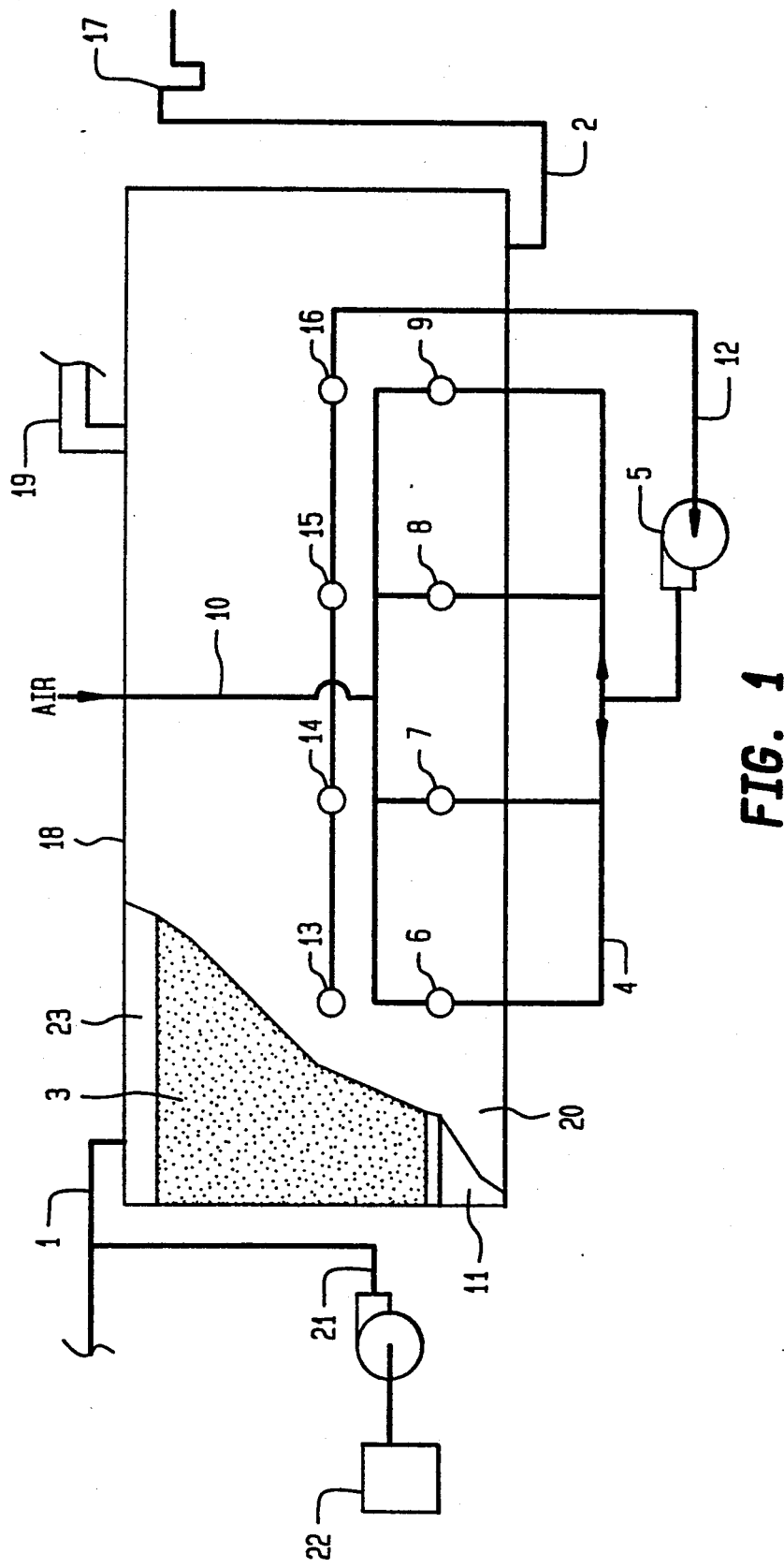
FIG. 1 is a schematic front view drawing of the bioreactor having a partial cutaway view of the bioreactor configured for aerobic operation.

Referring to FIG. 1 there is shown a front cutaway view of the bioreactor configured for aerobic operation. Wastewaters or groundwaters containing solvents, paint components, or other organic pollutants are fed into the bioreactor either by pumping or by gravity feed through inlet pipe 1. The aqueous waste contacts liquid in the bioreactor and is rapidly dispersed across the fixed film created by the growth and attachment of appropriate aerobic micro-organisms on the surface of packing material 3. Rapid dispersion of organic pollutants is accomplished by pumping bioreactor liquids through the recirculation piping 4 by means of the recirculation pump 5. Bioreactor liquids are pumped under pressure through eductors 6, 7, 8, and 9 which are designed to educt by venturi action a known quantity of ambient air through the air piping 10 and into direct contact with bioreactor liquids in the eductors 6, 7, 8, and 9. Both air and liquid are forced through the eductors thereby creating means for rapid and efficient oxygen transfer from the air medium to the liquid medium. Eductors are standard articles of commerce (Pemberthy Mfg., Pardee Mfg. Fluidyne Mfg.) and are selected on the basis of oxygen requirements for any given waste volume and strength. The number of eductors can vary depending on these factors. Eductors are spaced evenly along one longitudinal side of the bioreactor. Eductors are attached at the base of the bioreactor beneath the internal grating 11 upon which bioreactor packing rests. Bioreactor packing 3 may be any inert material suitable for the growth of micro-organisms in a fixed film or biofilm such as polypropylene, polyethylene, ceramic, or other natural product having a void volume of 80 percent or more and a surface area of 25 or more square feet per cubic foot of volume, preferably configured in rings, saddles, or other random packing material.

Liquid from the bioreactor is withdrawn through outlets 13, 14, 15, and 16 which are situated above inlets adjacent to eductors 6, 7, 8, and 9 through recirculation piping 12 by the recirculation pump 5, creating a liquid flow regime inside the reactor as shown by arrows in FIG. 1A. The circular liquid motion created by this flow pattern results in a liquid force for the rapid dispersion of organic pollutants as they enter the bioreactor at 1 and in rapid flow across the surface of packing materials 3. Purified water exits the bioreactor via effluent pipe 2 which is connected to level control piping arrangement 17 which serves to set liquid level in the bioreactor 18 above the packing material 3.

Rapidly flowing liquid tends to move the random packing material and to minimize plugging by excessive growth of microbial fixed film.

Excess air which enters the bioreactor 18 through eductors 6, 7, 8, and 9 is exhausted from the reactor through off-gas exhaust vent 19.

Figure 2:
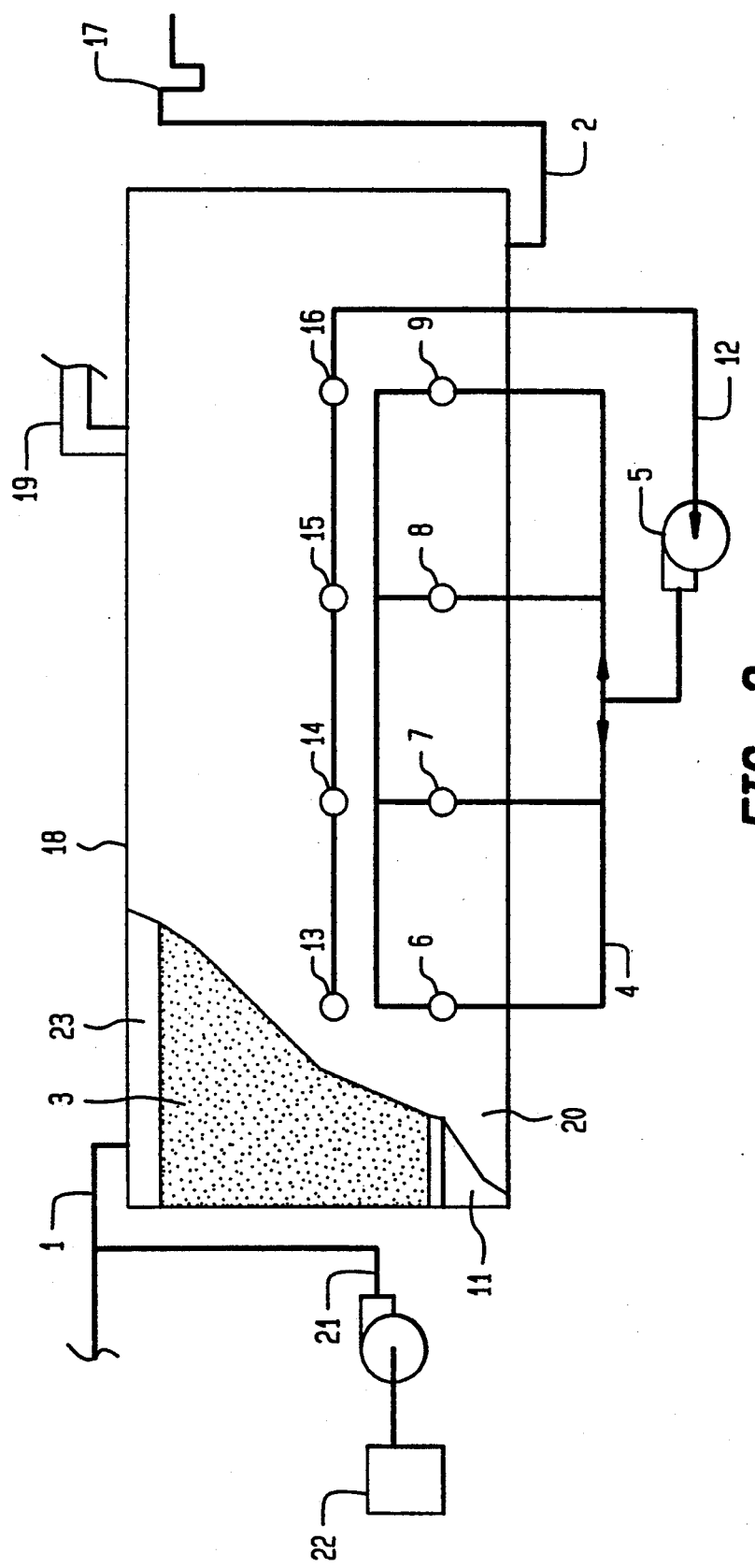
FIG. 2 is a schematic drawing of the bioreactor having a partial cutaway view of the bioreactor configured for anaerobic operation.
Figure 2A:
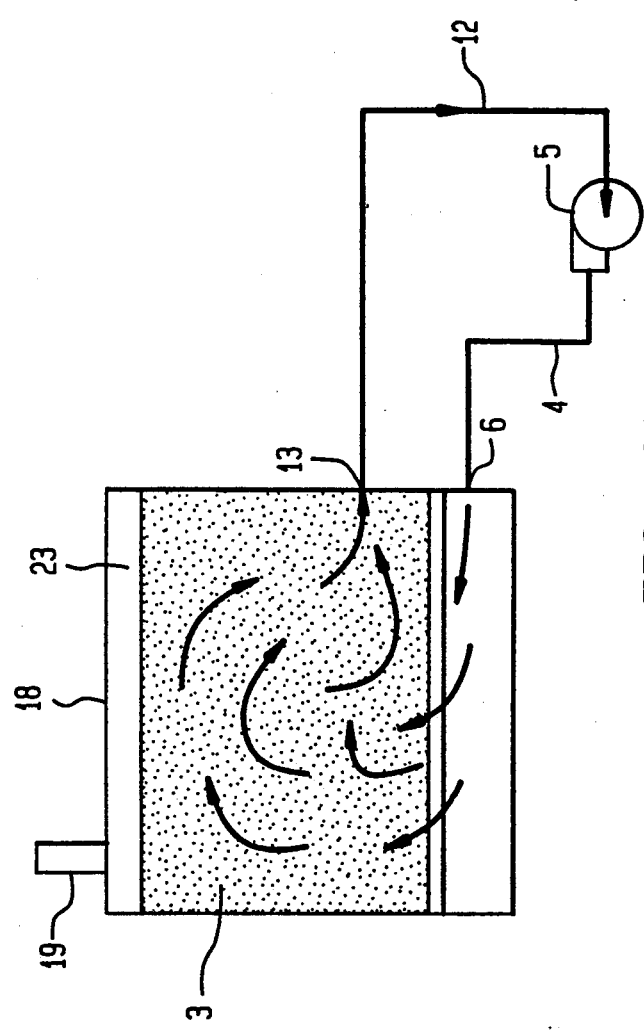
FIG. 2A is an end view of the bioreactor configured for anaerobic operation.

Referring to FIG. 2 there is shown a front cutaway view of the bioreactor configured for anaerobic operation. Wastewaters or groundwaters containing solvents, paint components, or other organic pollutants are fed into the bioreactor whether by pumping or by gravity feed through inlet pipe 1. The aqueous waste contacts liquid in the bioreactor and is rapidly dispersed across the fixed film created by the growth and attachment of appropriate anaerobic micro-organisms on the surface of packing material 3. Rapid dispersion of organic pollutants is accomplished by pumping bioreactor liquids through the recirculating piping 4 by means of the recirculation pump 5. Bioreactor liquids are pumped under pressure through inlet pipes 6, 7, 8, and 9 which provides motive force for the flow of liquid inside the bioreactor. The number of inlet pipes are spaced evenly along one longitudinal side of the bioreactor and are attached at the base of the bioreactor beneath the internal grating 11 upon which bioreactor packing rests. Bioreactor packing 3 may be any inert material suitable for the growth of micro-organisms in a fixed film or biofilm such as polypropylene, polyethylene, ceramic, or other natural product having a void volume of 80 percent or more and a surface area of 25 or more square feet per cubic foot of volume, preferably configured in rings, saddles, or other packing material.

Liquid from the bioreactor is withdrawn through outlets 13, 14, 15, and 16 which are situated above inlets 6, 7, 8, and 9 through recirculation piping 12 by the recirculation pump 5, creating a liquid flow regime inside the reactor as shown by arrows in FIG. 1A. The circular liquid motion created by this flow pattern results in a liquid force for the rapid dispersion flow pattern results in a liquid force for the rapid dispersion or organic pollutants as they enter the bioreactor at 1 and in rapid flow across the surface of packing material 3. Purified water exits the bioreactor via effluent pipe 2 which is connected to level control piping arrangement 17 which serves to set liquid level in the bioreactor 18 above the packing material 3.

Gases such as methane produced during anaerobic metabolism of the waste is exhausted from the reactor through off-gas exhaust vent 19.

In either aerobic or anaerobic configuration treated wastewater exits the reactor through outlet piping 2 and level control piping arrangement 17. Rapidly flowing liquid thus also tends to move the random packing material and to minimize plugging by excessive growth of microbial fixed film.

In either arrangement, aerobic or anaerobic, contaminated waters are pumped to the bioreactor 18, via inlet line 1. Referring to FIG. 1, as the contaminated waters flow through line 1, they are supplemented with a nutrient mixture pumped by nutrient feed pump 21, from tank 22. The nutrients fed into the contaminated waters are in the form of an aqueous solution of appropriate nitrogen, phosphorous, and optionally, other inorganic salts necessary for the maintenance of enhanced bioactivity. Preferred nitrogen containing compounds are Urea, $NH_4Cl$, $NH_4NO_3$, $NaNO_3$, or $(NH_4)_2SO_4$. Phosphorous is provided by diammonium phosphate, $KH_2PO_4$, $Na_2PO_4$ and the like.

After enrichment with nutrients, the water flows into treatment chamber 23 of bioreactor. In bioreactor 18, the groundwater flows through support media 23 containing the bacterial culture fixed thereto. In response to the injection of nutrients and contaminants, the bacterial culture grows and biodegrades the contaminants. The majority of the micro-organisms remain fixed to support media 3 as the groundwater flows over the support media 3. Some of the micro-organisms, however, detach from, or slough off, the support media and disperse into the groundwater. The fixed micro-organisms continually grow replacing those micro-organisms sloughing off; continual growth by the fixed bacterial cell population results in a substantially constant microbial biomass within bioreactor 18.

Upon reaching the bottom of treatment chamber 23, the now treated water flows through outflow pipe 2 and through level control arrangement 17 and may be directed to any suitable collection tank, clarifier, or filter depending on the needs of the specific process application.

Biotreatment following the above procedures may be performed at ambient temperatures. Those skilled in the art will appreciate, however, that biotreatment is more efficient at the optimum temperatures for microbial growth and biodegradation. The preferred temperature may be determined empirically. Accordingly, to insure the maintenance of preferred temperatures in colder climates, the apparatus may be equipped with heating units (not shown) and insulation.

Bioremediation following the above procedure is effective for the treatment of a wide variety of hazardous substances. Typical hazardous substances which may be bioremedial using the process of the invention include:

(a) alcohols, e.g., isopropanol, ethanol, butanol, ethylene glycol;

(b) aromatics, e.g., benzene, toluene, ethylbenzene, xylenes;

(c) carbohydrates, e.g., glucose, fructose;

(d) ketones, e.g., methylethylketone;

(e) petroleum hydrocarbons, e.g., gasoline, diesel, fuel oils, motor oils, crude oil;

(f) phthalates, e.g., o-phthalate;

(h) solvents, e.g., methylene chloride, acetone, stoddard solvent, tetrahydrofuran;

(i) chlorinated compounds, e.g., monochlorobenzene, 1,2-dichloroethane;

(j) detergents;

(k) and mixtures thereof.

It is recognized, however, that virtually any material which may be biodegraded may be treated with the apparatus and method of the present invention, depending only on advantages of either anaerobic or aerobic micro-organisms for the biodegradation of specific wastes.

The apparatus has several advantages resulting from the use of internal high flow rates created by pumping liquid rapidly over the surface of a fixed microbial film capable of degradation of specific organic wastes.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An apparatus for microbiological treatment of contaminated water comprising:
    a treatment chamber having a contaminated water main inlet connected through an upper surface of, and for filling, said chamber and a perforated plate connected within, and spaced above, a bottom surface of said chamber;
    a contaminated water recirculating outlet positioned above said perforated plate and below a liquid level of the contaminated water within said chamber, said recirculating outlet operably connected to an inlet of a pump, an outlet of said pump operably connected to a recirculating inlet into said chamber positioned between said bottom surface and said perforated plate;
    bioreactor packing material supporting microorganisms disposed within said chamber resting atop said perforated plate and extending upwardly to a height in the vicinity of the contaminated water level;
    a treated water outlet conduit having one end thereof connected through said chamber bottom surface for removing treated water from said chamber for discharge through an open end of said outlet conduit, said outlet conduit configured having an elevated portion thereof which establishes and maintains the contaminated water level within said chamber.

2. An apparatus for microbiological treatment of contaminated water as set forth in claim 1 further comprising:
    an eductor operably positioned in-line between said pump and said recirculating inlet and connected to an air inlet, said eductor structured for mixing air with the contaminated water just prior to entering said chamber through said recirculating inlet.

3. An apparatus for microbiological treatment of contaminated water as set forth in claim 2, further comprising:
    a gas vent connected to a top surface of said chamber structured for releasing excess gas and air from within said chamber.

4. An apparatus for microbiological treatment of contaminated water as set forth in claim 1, wherein:
    said recirculating inlet and said recirculating outlet are positioned in spaced apart generally upright alignment one to another.

5. An apparatus for microbiological treatment of contaminated water as set forth in claim 1, further comprising:
    means for mixing a nutrient with contaminated water just prior to entry of the contaminated water into said chamber through said main inlet.

6. An apparatus as set forth in claim 1, wherein:
    said main inlet is positioned for downward flow of contaminated water entering said chamber and for counterflow against contaminated water circulated within said chamber by said pump.

7. A continuous method of treating contaminated water comprising the steps of:
    A. maintaining a flow of contaminated water into a treatment chamber through a contaminated water main inlet connected through an upper surface of said chamber, said chamber also having a perforated plate connected within, and spaced above, a bottom surface of said chamber;
    said chamber including bioreactor packing supporting microorganisims disposed therein atop said perforated plate and a contaminated water recirculating outlet positioned above said perforated plate and below the liquid level of the contaminated water maintained within said chamber, said recirculating outlet operably connected to an inlet of a pump, an outlet of said pump operably connected to a recirculating inlet into said chamber positioned between said bottom surface and said perforated plate;
    B. continually circulating the contaminated water from said recirculating outlet through said pump, then into said recirculating inlet for generally circular movement up through said perforated plate and through and over said packing material;
    C. continually draining treated water from the bottom of said chamber through an outlet conduit connected at one end thereof through said bottom surface, said outlet conduit configured to establish and maintain the contaminated water level within said chamber.

8. A method as set forth in claim 7, further comprising the step of:
    C. mixing air with said recirculating contaminated water at a point between said pump and said return inlet during step B.

9. A method as set forth in claim 8, further comprising the step of:
    D. venting gas from said chamber through a gas vent connected to a top surface of said chamber during step B.

10. A method as set forth in claim 7, further comprising the step of:
    E. enhancing circular circulation of said contaminated water within said chamber by positioning said outlet directly above said return inlet.

11. A method as set forth in claim 7, further comprising the step of:
    F. mixing a nutrient with said contaminated water just prior to entry of said contaminated water into said chamber thorough said main inlet during step A.

12. A method as set forth in claim 7, wherein:
    said main inlet is positioned for downward flow of contaminated water entering said chamber and for counterflow against contaminated water circulated within said chamber by said pump.

* * * * *